(12) United States Patent
Meyer et al.

(10) Patent No.: US 8,503,142 B2
(45) Date of Patent: Aug. 6, 2013

(54) METHOD FOR SELECTIVELY TRIGGERING CIRCUIT BREAKERS IN THE EVENT OF A SHORT CIRCUIT

(75) Inventors: Joerg Meyer, Dresden (DE); Peter Schegner, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 379 days.

(21) Appl. No.: 13/000,897

(22) PCT Filed: Jun. 26, 2009

(86) PCT No.: PCT/EP2009/058061
§ 371 (c)(1),
(2), (4) Date: Dec. 22, 2010

(87) PCT Pub. No.: WO2009/156513
PCT Pub. Date: Dec. 30, 2009

(65) Prior Publication Data
US 2011/0110006 A1    May 12, 2011

(30) Foreign Application Priority Data
Jun. 27, 2008   (DE) .......................... 10 2008 030 987

(51) Int. Cl.
*H02H 7/26* (2006.01)
(52) U.S. Cl.
USPC .................. 361/67; 361/2; 361/62; 361/93.1; 361/115
(58) Field of Classification Search
None
See application file for complete search history.

(56) References Cited

U.S. PATENT DOCUMENTS

| | | | | |
|---|---|---|---|---|
| 2,924,752 A | * | 2/1960 | Scott, Jr. | ........................... 361/12 |
| 5,689,397 A | * | 11/1997 | Pohl et al. | ...................... 361/115 |
| 6,297,939 B1 | * | 10/2001 | Bilac et al. | ...................... 361/64 |
| 6,392,857 B1 | | 5/2002 | Bastard | |

FOREIGN PATENT DOCUMENTS

| | | |
|---|---|---|
| CN | 2821850 Y | 9/2006 |
| GB | 2 348 554 A | 10/2000 |
| WO | WO 2006108860 A1 | 10/2006 |

OTHER PUBLICATIONS

German priority document DE 10 2008 030 987.7 filed Jun. 27, 2008.
PCT priority document PCT/EP2009/058061 filed Jun. 26, 2009.

* cited by examiner

*Primary Examiner* — Stephen W Jackson
*Assistant Examiner* — Terrence Willoughby
(74) *Attorney, Agent, or Firm* — Harness, Dickey & Pierce, P.L.C.

(57) ABSTRACT

A method is disclosed for selectively triggering circuit breakers in the event of a short circuit, wherein an upstream circuit breaker and at least one downstream circuit breaker on the output side are provided. In at least one embodiment, the upstream circuit breaker monitors as to whether the or one of the downstream circuit breakers is already in the process of opening the switch contacts thereof to interrupt the circuit on the output side, while forming a switch arc. In order to reliably determine whether a downstream circuit breaker is already in the process of opening, according to at least one embodiment of the invention the upstream circuit breaker, so as to detect a switch arc on the output side, checks whether the ohmic resistance of the short circuit loop produced by a short circuit has an exponential curve over time in that an exponent is continually computed and based on the computer exponent the switch arc is determined if the computed exponent exceeds a threshold.

20 Claims, 3 Drawing Sheets

FIG 3

$$u(t) = Ri(t) + L\frac{di(t)}{dt} + ae^{b(t-t_0)}i(t) + \text{sign}[i(t)]U_{AK} \quad (3a)$$

$$u(t) = ae^{b(t-t_0)}i(t) + L\frac{di(t)}{dt} \quad (3b)$$

$$u_1 = ae^{b(t_1-t_0)}i_1 + L\frac{di(t)}{dt}\bigg|_1 \quad (3c)$$

$$u_2 = ae^{b(t_2-t_0)}i_2 + L\frac{di(t)}{dt}\bigg|_2 \quad (3d)$$

$$u_3 = ae^{b(t_3-t_0)}i_3 + L\frac{di(t)}{dt}\bigg|_3 \quad (3e)$$

$$b_{1,2} = f_a(1-T_{1,2}) = f_a\left(1+\left[\frac{1}{2U}(V\pm\sqrt{V^2-4UW})\right]\right) \quad (3f)$$

$$U = \left(\frac{u_2}{i_2}\frac{di_3/dt}{i_3} - \frac{u_3}{i_3}\frac{di_2/dt}{i_2}\right) \quad (3g)$$

$$V = \left(\frac{u_3}{i_3}\frac{di_1/dt}{i_1} - \frac{u_1}{i_1}\frac{di_3/dt}{i_3}\right) \quad (3h)$$

$$W = \left(\frac{u_1}{i_1}\frac{di_2/dt}{i_2} - \frac{u_2}{i_2}\frac{di_1/dt}{i_1}\right) \quad (3i)$$

FIG 4
$$u(t) = R\,i(t) + L\frac{di(t)}{dt} \quad (4a)$$
FIG 5
$$u^*(t) = u(t) - R\,i(t) - L\frac{di(t)}{dt} = a e^{b(t-t_0)} i(t) + \text{sign}[i(t)] U_{AK} \quad (5a)$$
FIG 6
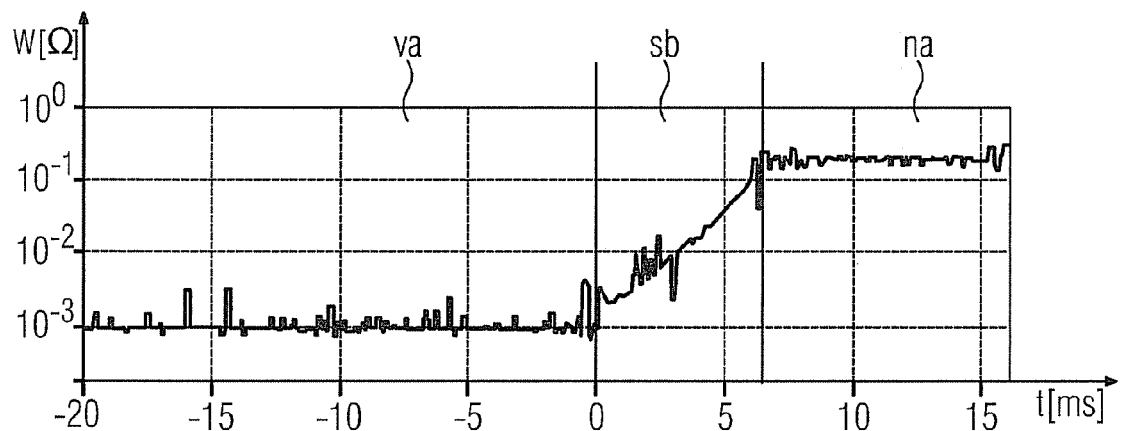
FIG 7
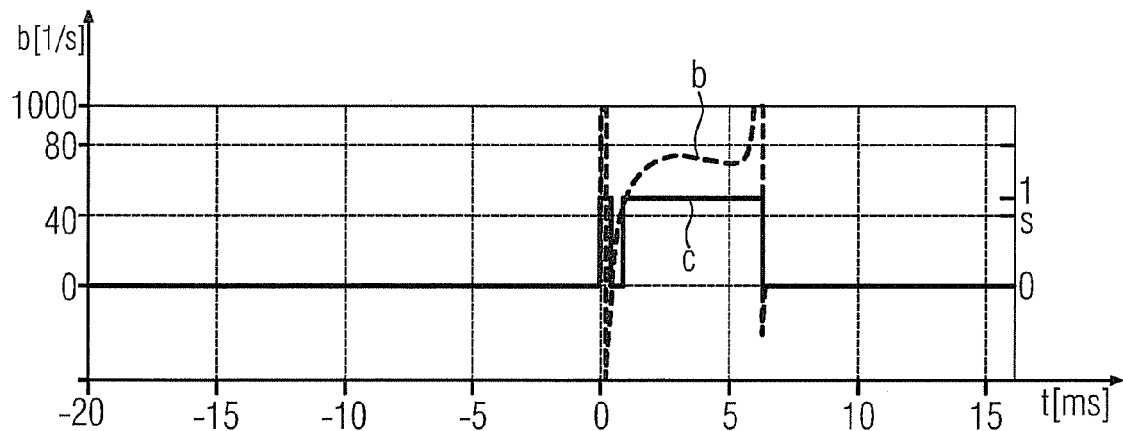

METHOD FOR SELECTIVELY TRIGGERING CIRCUIT BREAKERS IN THE EVENT OF A SHORT CIRCUIT

PRIORITY STATEMENT

This application is the national phase under 35 U.S.C. §371 of PCT International Application No. PCT/EP2009/058061 which has an International filing date of Jun. 26, 2009, which designates the United States of America, and which claims priority on German patent application number DE 10 2008 030 987.7 filed Jun. 27, 2008, the entire contents of each of which are hereby incorporated herein by reference.

FIELD

At least one embodiment of the invention generally relates to a method for selective tripping of circuit breakers, in particular of low-voltage circuit breakers, in the event of a short.

BACKGROUND

It is known for circuit breakers to be connected in series, wherein the circuit breaker which is arranged immediately downstream from the current feed is generally followed on the load side by a plurality of circuit breakers. It is also known for circuit breakers to be tripped selectively in the event of a short. In this case, selectively means that that circuit breaker is in each case tripped which is located closest to the location of the short, seen from the current feed, as a result of which no more loads than those which are unavoidable are affected by the disconnection. In order to achieve this, the mutual upstream and downstream circuit breakers can be the subject of current and time grading, in which case the circuit breaker close to the feed has longer disconnection times than those which are further away from the feed. This means that the upstream circuit breakers are disconnected only when they themselves are closest to the short, or else in the event of a protection failure of a downstream circuit breaker, where a downstream circuit breaker does not trip even though it should trip. In the case of current and time grading such as this, circuit breakers are configured such that they trip at ever greater currents and after ever longer times in the feed direction, in the event of a short.

In order to shorten the relatively long disconnection times that this requires, the downstream circuit breakers can in each case signal to the upstream circuit breakers that they are carrying out the disconnection. However, this requires a relatively large amount of additional circuit complexity.

In order to reduce this complexity, WO 2006/108860 A1 proposes that an upstream circuit breaker monitors one or more downstream circuit breakers, with the monitoring being carried out on the basis of the output-side impedance. The impedance is significant in the event of a short, when one of the downstream circuit breakers should in this case trip, that is to say it already opens its switching contacts in order to interrupt the output-side circuit, and this is associated with the formation of a switching arc between the switching contacts. This switching arc results in a typical rise in the output-side impedance, which is detected by the upstream circuit breaker which can identify that a downstream circuit breaker has already tripped, and that it need not trip itself. If the upstream circuit breaker has already started the process of opening its own switching contacts, then it can close them again.

SUMMARY

At least one embodiment of the invention specifies a method which makes it possible to reliably detect whether a downstream circuit breaker is in this case ready to disconnect the relevant circuit in the event of a short.

The solution provides that in order to detect a switching arc on the output side, the upstream circuit breaker in each case checks whether the resistance of the short-circuit loop formed by a short has an exponential profile over time, in that an exponent is continuously calculated, and the switching arc is detected on the basis of the calculated exponent when the calculated exponent exceeds a predetermined threshold value. At least one embodiment of the invention is based on the fact that the resistance of a short-circuit loop has an exponential profile because of the switching arc and that the presence of the exponential profile can be detected by continuous calculation of the exponent. The calculation is carried out continuously as soon as a short-circuit current is detected (and there is not yet any switching arc). Once the switching arc has been formed between the switching contacts, the exponent determined in this way in each case changes suddenly to a value which is considerably above a threshold value which can be specified.

It is technically simple for the exponent to be calculated continuously from the time profile of the output-side voltage and the time profile of the output-side current, as well as its derivative with respect to time. This corresponds to a simplification of the relationships for model purposes which can be described by a corresponding equivalent circuit.

The derivative of the current with respect to time is expediently measured directly.

The accuracy can be improved if that component of the inductance of the short-circuit loop which is constant over time is taken into account for the continuous calculation of the exponent.

It is simpler if the output-side voltage, the output-side current and their derivative with respect to time are continuously sampled at a predetermined frequency, and these sample values themselves are then continuously inserted into an appropriate equation system, whose continuous solution is in each case the exponent to be calculated. The sample values for one time are in each case inserted into one of the equations of the equation system, until the unknowns in the equation system can be calculated in a known manner. (At least) the sample values relating to three (immediately successive) times are therefore required in order to solve the equation system for an equation system having three unknowns.

The accuracy can be improved with the computation complexity being reduced if, in the event of a short, that component of the inductance and of the resistance of the short-circuit loop which is constant over time is calculated for the sample values occurring before the exponential profile, and the inductance determined in this way and the resistance are used to correct the output-side voltage during the exponential profile as a result of the switching arc. The constant inductance and the constant component of the resistance of the short-circuit loop are therefore determined with the aid of the sample values before the exponential profile, in order in this way to correct the output-side measured voltage, and thus to improve the accuracy of the calculated exponent.

BRIEF DESCRIPTION OF THE DRAWINGS

The invention will be described in more detail in the following text with reference to one exemplary embodiment. In the figures:

FIG. 3 shows the equations for calculation of the exponent, taking account of the inductance and ignoring the constant anode-cathode voltage drop, FIG. 4 shows the equation for calculation of inductance and resistance outside the exponential profile, FIG. 5 shows the equation for correction of the voltage of the short-circuit loop, taking account of the inductance and the resistance as shown in FIG. 4, FIG. 6 shows a schematic illustration of the resistance plotted against time, and FIG. 7 shows a schematic illustration of the exponent of the time profile of the resistance as shown in FIG. 1, with a threshold value shown.

DETAILED DESCRIPTION OF THE EXAMPLE EMBODIMENTS

Figure 1:
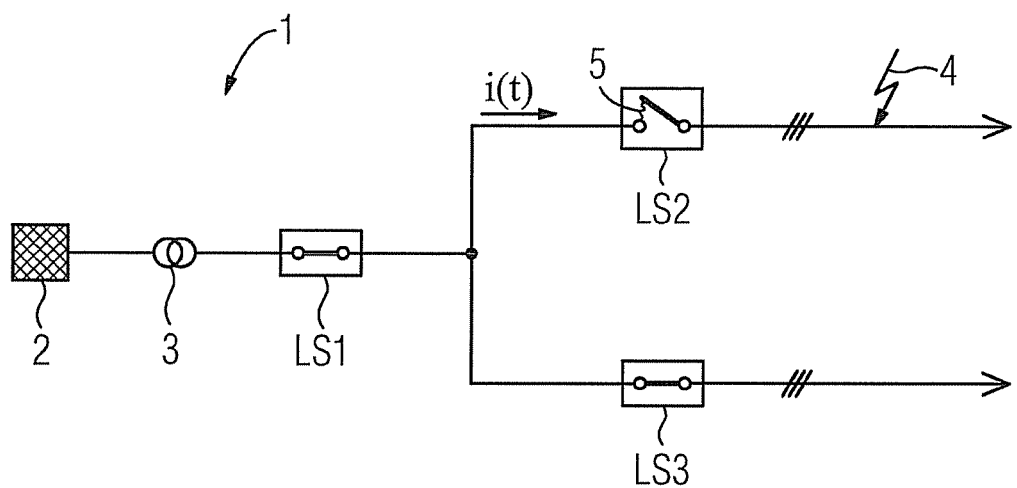
FIG. 1 shows a schematic illustration of a circuit arrangement having two downstream circuit breakers.

FIG. 1 shows a current feed 1 having an electrical power supply system 2 and a transformer 3. FIG. 1 also shows a circuit arrangement having a plurality of circuit breakers, in this case with three circuit breakers LS1, LS2, LS3 which are current-limiting low-voltage circuit breakers, which have very short disconnection times. The current feed 1 is first of all followed by the circuit breaker LS1 (close to the feed), which is arranged upstream of the two circuit breakers LS2, LS3, which are in this case disconnected in parallel. The two circuit breakers LS2, LS3 are connected downstream from the circuit breaker LS1, in each case seen from the current feed 1. The circuit breakers LS2, LS3 could, of course, also be connected one behind the other in series.

The large arrow on the right in FIG. 1 indicates that there is a short 4 downstream from the circuit breaker LS2, wherein the circuit breaker LS2 is closest to the short 4. FIG. 1 also shows that the circuit breaker LS2 (tripped, for example, by a release which is not shown) is in this case already being opened. During this process, a switching arc 5, which is shown in FIG. 1, is struck between the opening switching contacts of the circuit breaker LS2, and is quenched again as the switching contacts open further. The opened switching contacts interrupt the output-side short-circuit loop (short-circuit current loop) of the output-side circuit 6a, and disconnect the circuit 6a from the current feed 1.

The upstream circuit breaker LS1 observes (monitors) the output-side resistance W of the short-circuit loop 6 formed by the short 4 in FIG. 1, to determine whether this has a profile which is exponential over time.

Figure 2:
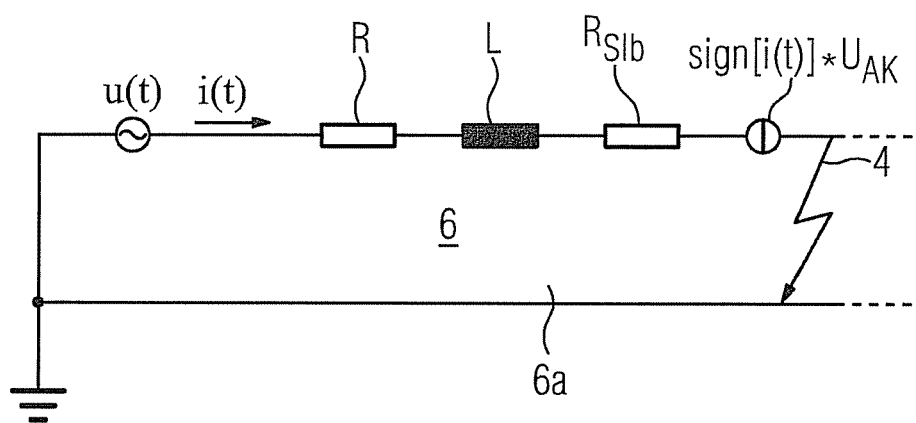
FIG. 2 shows an equivalent circuit for the current loop of a downstream circuit breaker as shown in FIG. 1.

FIG. 2 shows an equivalent circuit of the short-circuit loop 6 of the upstream circuit breaker LS1 as shown in FIG. 1, which is formed by a short 4. In FIG. 2, the switching arc 5 is illustrated as a variable resistance Rslb with a profile which is exponential over time. The equivalent circuit of the short-circuit loop furthermore has a resistance R which is constant over time and an inductance L which is constant over time, which are connected in series with the switching arc 5. The output-side resistance W which is monitored by the upstream circuit breaker LS1 therefore in this case results from the sum of the resistance R and the resistance Rslb. Furthermore, a constant anode-cathode voltage drop UAK is taken into account, which in each case occurs briefly immediately after the opening of the switching contacts.

The time profile of the measured output-side voltage u(t) of the circuit breaker LS1 is given by the equation 3a illustrated in FIG. 3, and this is also referred to as the starting voltage equation.

Equation 3b in FIG. 3 corresponds to the equation 3a, but taking account only of the inductance (resistance R and the anode-cathode voltage drop UAK are ignored). Equation 3b already leads to relatively good results for the calculation of the exponent b.

The exponent b is calculated by solving the three equations 3c, 3d, 3e, that is to say by solving an equation system with three unknowns. The voltage values ui, the current values ii and the change in the current after the time dii/dt at three immediately successive times ti are determined for this purpose, and are inserted into the three equations. The index i (also that on the right at the bottom in the time derivative of the three equations) corresponds to the numbering i of the three immediately successive times ti. The solution of the equation system results in an exponent b1 and an exponent b2 according to equation 3f. The values U, W and V in equation 3f are obtained from the equations 3g, 3h, 3i by insertion of the corresponding voltage values ui, current values ii and the values of the derivatives of the current over time dii/dt. Only one of the continuous exponents b1i and b2i obtained in this way makes physical sense; this is sorted out by way of appropriate logic. The exponent b is then obtained by averaging the exponents b1i and b2i which have been sorted out.

Since there is a new (measurement) value triple (ui+1, ii+1, dii+1/dt) for each new time, the calculation is carried out such that the value triple (ui−2, ii−2, dii−2/dt) which is furthest back in time of the three value pairs (ui−2, ii−2, dii−2/dt), (ui−1, ii−1, dii−1/dt), (ui, ii, dii/dt) used for calculation purposes is deleted, and only the two remaining value triples (ui−1, ii−1, dii−1/dt), (ui, ii, dii/dt) as well as the new value triple (ui+1, ii+1, dii+1/dt) are still used.

In order to simplify the calculation and in order to avoid having to decide between two continuous exponents b1i and b2i in each case, the value triple (ui, ii, dii/dt) for the short-circuit loop 6 in the event of a short is measured continuously before the creation of a switching arc 5, and, on the basis of these values, equation 4a in FIG. 4 is used to determine the inductance L, which is constant over time, and the resistance R, which is constant over time, for example analogously to the process described above for the value triples for an equation system with three unknowns. Subsequent smoothing results in the constant component of the resistance R and the inductance L.

The resistance R which is constant over time and the inductance L which is constant over time are used to correct the measured voltage u(t), using equation 5a in FIG. 5. The two variables inductance L and resistance R then no longer occur in the equation system for calculation of the exponent b, thus considerably simplifying the calculation of the exponent b. In particular, there is also no longer any need to decide between two exponents b1 and b2.

FIG. 6 shows the output-side resistance W (as the sum of the resistance R and the resistance Rslb) as a function of time in the event of a short (area va), during (area sb) and after the occurrence (area ns) of the switching arc 5.

FIG. 7 shows the result of the calculation of the exponent b, from which it can be seen that there is a sudden change in the calculated exponent b in the area of the switching arc 5, in which case a predetermined threshold value S is then in each case exceeded. A switching arc 5 is present here, and is reliably identified on the basis of the exponent b. The curve c represents the digital output signal which is obtained by comparison of the calculated exponent b with the threshold value S, with the curve c changing suddenly from 0 to 1 in each case.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for selective tripping of at least one of a plurality of circuit breakers the event of a short, the plurality of circuit breakers including an upstream circuit breaker and, on an output side, at least one downstream circuit breaker, the method comprising:
monitoring, via the upstream circuit breaker, to detect whether the at least one downstream circuit breaker is forming a switching arc to open its switching contacts in order to interrupt and selectively trip a circuit on the output side, the monitoring including checking, via the upstream circuit breaker whether a resistance of a short-circuit loop formed by a short has an exponential profile over time, wherein an exponent is continuously calculated and the switching arc is detected upon the calculated exponent exceeding a threshold value.

2. The method as claimed in claim 1, wherein the exponent is calculated continuously from the time profile of the output-side voltage and the time profile of the output-side current and its derivative with respect to time.

3. The method as claimed in claim 2, wherein the derivative with respect to time of the current is measured.

4. The method as claimed in claim 3, wherein the component of the inductance of the short-circuit loop which is constant over time is taken into account for the continuous calculation of the exponent.

5. The method as claimed in claim 1, wherein the output-side voltage and the output-side current are continuously sampled at a frequency, and the sample values themselves and their derivative with respect to time are then continuously inserted into an appropriate equation system, whose continuous solution is in each case the exponent to be calculated.

6. The method as claimed in claim 1, wherein a corrected output-side voltage is used for the continuous calculation of the exponent, wherein the correction takes account of those components of the inductance and of the resistance of the short-circuit loop which are constant over time, in the time periods in which the exponent is below the threshold value.

7. The method as claimed in claim 6, wherein, the component of the inductance and of the resistance of the short-circuit loop which is constant over time is calculated for the sample values occurring before the exponential profile, and is used to correct the output-side voltage during the exponential profile as a result of the switching arc.

8. The method as claimed in claim 2, wherein the output-side voltage and the output-side current are continuously sampled at a frequency, and the sample values themselves and their derivative with respect to time are then continuously inserted into an appropriate equation system, whose continuous solution is in each case the exponent to be calculated.

9. The method as claimed in claim 2, wherein a corrected output-side voltage is used for the continuous calculation of the exponent, wherein the correction takes account of those components of the inductance and of the resistance of the short-circuit loop which are constant over time, in the time periods in which the exponent is below the threshold value.

10. The method as claimed in claim 9, wherein, the component of the inductance and of the resistance of the short-circuit loop which is constant over time is calculated for the sample values occurring before the exponential profile, and is used to correct the output-side voltage during the exponential profile as a result of the switching arc.

11. The method as claimed in claim 3, wherein the output-side voltage and the output-side current are continuously sampled at a frequency, and the sample values themselves and their derivative with respect to time are then continuously inserted into an appropriate equation system, whose continuous solution is in each case the exponent to be calculated.

12. The method as claimed in claim 3, wherein a corrected output-side voltage is used for the continuous calculation of the exponent, wherein the correction takes account of those components of the inductance and of the resistance of the short-circuit loop which are constant over time, in the time periods in which the exponent is below the threshold value.

13. The method as claimed in claim 12, wherein, the component of the inductance and of the resistance of the short-circuit loop which is constant over time is calculated for the sample values occurring before the exponential profile, and is used to correct the output-side voltage during the exponential profile as a result of the switching arc.

14. The method as claimed in claim 4, wherein the output-side voltage and the output-side current are continuously sampled at a frequency, and the sample values themselves and their derivative with respect to time are then continuously inserted into an appropriate equation system, whose continuous solution is in each case the exponent to be calculated.

15. The method as claimed in claim 4, wherein a corrected output-side voltage is used for the continuous calculation of the exponent, wherein the correction takes account of those components of the inductance and of the resistance of the short-circuit loop which are constant over time, in the time periods in which the exponent is below the threshold value.

16. The method as claimed in claim 15, wherein, the component of the inductance and of the resistance of the short-circuit loop which is constant over time is calculated for the sample values occurring before the exponential profile, and is used to correct the output-side voltage during the exponential profile as a result of the switching arc.

17. A method for selective tripping of at least one of a plurality of circuit breakers in the event of a short, the plurality of circuit breakers including an upstream circuit breaker and, on an output side, at least one downstream circuit breaker, the method comprising:
detecting, via the upstream circuit breaker, whether the at least one downstream circuit breaker is forming a switching arc on the output side, the detecting including determining whether a resistance of a short-circuit loop formed by a short has an exponential profile over time, wherein an exponent is continuously calculated and the switching arc is detected upon the calculated exponent exceeding a threshold value; and
opening switching contacts of the at least one downstream circuit breaker, to interrupt and selectively trip a circuit of the at least one downstream circuit breaker on the output side, upon detecting that the at least one downstream circuit breaker is forming a switching arc on the output side.

18. The method as claimed in claim 17, wherein the exponent is calculated continuously from the time profile of the output-side voltage and the time profile of the output-side current and its derivative with respect to time.

19. The method as claimed in claim 18, wherein the derivative with respect to time of the current is measured.

20. The method as claimed in claim 17, wherein, the component of the inductance of the short-circuit loop which is constant over time is taken into account for the continuous calculation of the exponent.

* * * * *